US012022583B2

(12) United States Patent
Ding et al.

(10) Patent No.: US 12,022,583 B2
(45) Date of Patent: Jun. 25, 2024

(54) PORTABLE DEVICES, SYSTEMS AND METHODS WITH AUTOMATED HEAT CONTROL ASSEMBLY

(71) Applicant: ASIATELCO TECHNOLOGIES, INC., Newport Beach, CA (US)

(72) Inventors: Junming Ding, Shanghai (CN); Rayford Higginbotham, Huntington Beach, CA (US); Chengping Chen, Irvine, CA (US)

(73) Assignee: ASIATELCO TECHNOLOGIES, INC., Newport Beach, CA (US)

( * ) Notice: Subject to any disclaimer, the term of this patent is extended or adjusted under 35 U.S.C. 154(b) by 0 days.

(21) Appl. No.: 17/037,233

(22) Filed: Sep. 29, 2020

(65) Prior Publication Data

US 2022/0015202 A1 Jan. 13, 2022

Related U.S. Application Data

(63) Continuation-in-part of application No. 16/926,610, filed on Jul. 10, 2020, and a continuation-in-part of application No. 16/926,601, filed on Jul. 10, 2020.

(51) Int. Cl.
*F21L 4/00* (2006.01)
*F21V 29/83* (2015.01)
*H05B 45/18* (2020.01)

(52) U.S. Cl.
CPC .............. *H05B 45/18* (2020.01); *F21L 4/005* (2013.01); *F21V 29/83* (2015.01)

(58) Field of Classification Search
CPC ........... H05B 45/18; F21V 29/83; F21L 4/005
See application file for complete search history.

(56) References Cited

U.S. PATENT DOCUMENTS

| | | | | |
|---|---|---|---|---|
| 4,933,178 | A | 6/1990 | Capelli | |
| 5,024,535 | A * | 6/1991 | Winston, Jr. | G01K 7/01 327/512 |
| 5,066,328 | A | 11/1991 | Zlotnik | |
| 5,236,773 | A | 8/1993 | Sorathia et al. | |
| 5,238,749 | A | 8/1993 | Cueman et al. | |

(Continued)

FOREIGN PATENT DOCUMENTS

| | | |
|---|---|---|
| WO | 01/89721 A1 | 11/2001 |

*Primary Examiner* — Nay Tun
(74) *Attorney, Agent, or Firm* — ORBIT IP, LLP

(57) ABSTRACT

Portable devices, systems and methods with automated heat control assembly are provided. The portable devices and systems comprise a light source, a current source, a heat control circuit, a temperature sensor and a processor. The current source is electrically coupled to the light source. The heat control circuit adapted to allow changing the current supplied to the light source. The temperature sensor adapted to measure a temperature adjacent the light source and to output an associated temperature sensor data to the processor. The processor configured to automatically adjust the current supply in the heat control circuit based on the temperature sensor data relative to a predetermined temperature threshold. The method comprises measuring a temperature adjacent a light source using a temperature sensor and automatically adjusting, using a processor, the current suppled to the light source based on the temperature sensor data relative to a predetermined temperature threshold.

26 Claims, 14 Drawing Sheets

(56) References Cited

U.S. PATENT DOCUMENTS

| | | | | |
|---|---|---|---|---|
| 5,244,667 | A | 9/1993 | Hagiwara et al. | |
| 5,322,555 | A | 6/1994 | Leung et al. | |
| D367,721 | S | 3/1996 | Maglica | |
| 5,681,575 | A | 10/1997 | Burrell et al. | |
| 5,753,251 | A | 5/1998 | Burrell et al. | |
| 5,756,145 | A | 5/1998 | Darouiche | |
| 5,770,255 | A | 6/1998 | Burrell et al. | |
| 5,837,362 | A | 11/1998 | O'Connell et al. | |
| 5,853,745 | A | 12/1998 | Darouiche | |
| 5,997,815 | A | 12/1999 | Anders et al. | |
| 6,020,419 | A | 2/2000 | Bock et al. | |
| 6,025,059 | A | 2/2000 | McGee | |
| 6,238,686 | B1 | 5/2001 | Burrell et al. | |
| 6,359,918 | B1 * | 3/2002 | Bielas | H01S 5/06804 372/32 |
| 6,361,567 | B1 | 3/2002 | Dearnaley | |
| 6,387,519 | B1 | 5/2002 | Anderson et al. | |
| 6,514,517 | B2 | 2/2003 | Jamiolkowski et al. | |
| 6,565,913 | B2 | 5/2003 | Arps et al. | |
| 6,592,814 | B2 | 7/2003 | Wilcox et al. | |
| 6,759,478 | B2 | 7/2004 | Anderson et al. | |
| 6,803,408 | B2 | 10/2004 | Anderson et al. | |
| 6,835,420 | B1 | 12/2004 | Roeckrath et al. | |
| 6,900,265 | B2 | 5/2005 | Schultz et al. | |
| 6,916,368 | B2 | 7/2005 | Vanier et al. | |
| 6,929,705 | B2 | 8/2005 | Myers et al. | |
| 7,053,149 | B2 | 5/2006 | Anderson et al. | |
| 7,115,050 | B2 | 10/2006 | Andre et al. | |
| 7,248,002 | B2 * | 7/2007 | Yamamoto | H05B 45/56 315/307 |
| 7,264,669 | B1 | 9/2007 | Tomasino et al. | |
| 7,282,214 | B2 | 10/2007 | Willcox et al. | |
| 7,402,318 | B2 | 7/2008 | Morris et al. | |
| 7,625,579 | B2 | 12/2009 | Read et al. | |
| 7,641,912 | B1 | 1/2010 | Redler | |
| 7,646,973 | B2 | 1/2010 | Howard et al. | |
| 7,662,433 | B2 | 2/2010 | Ford et al. | |
| 7,740,371 | B1 * | 6/2010 | Lebens | H05B 45/20 362/802 |
| 7,867,602 | B2 | 1/2011 | Hsu | |
| 7,871,690 | B2 | 1/2011 | Ashikaga | |
| 7,884,089 | B2 | 2/2011 | Gimvang | |
| 7,955,636 | B2 | 6/2011 | Terry | |
| 7,976,863 | B2 | 7/2011 | Wilcox et al. | |
| 8,066,854 | B2 | 11/2011 | Storey et al. | |
| 8,080,028 | B2 | 12/2011 | Cagle | |
| 8,084,132 | B1 | 12/2011 | Lezdey | |
| 8,124,169 | B2 | 2/2012 | Ylitalo et al. | |
| 8,133,423 | B2 | 3/2012 | Tang et al. | |
| 8,137,735 | B2 | 3/2012 | Wang et al. | |
| 8,163,357 | B2 | 4/2012 | Engardio et al. | |
| 8,169,165 | B2 | 5/2012 | West | |
| 8,172,395 | B2 | 5/2012 | Carney et al. | |
| 8,178,120 | B2 | 5/2012 | Vandesteeg et al. | |
| 8,366,290 | B2 | 2/2013 | Maglica | |
| 8,494,374 | B2 | 7/2013 | Snyder | |
| 8,723,427 | B2 * | 5/2014 | Collins | H05B 45/10 315/192 |
| 8,783,908 | B2 | 7/2014 | Gross et al. | |

| | | | | |
|---|---|---|---|---|
| 8,852,693 | B2 | 10/2014 | Legein et al. | |
| 9,363,860 | B1 | 6/2016 | Lowchareonkul | |
| 9,671,102 | B2 * | 6/2017 | Maglica | H01M 10/643 |
| 9,683,729 | B2 | 6/2017 | Rothschild | |
| 10,711,953 | B1 * | 7/2020 | Zhu | F21V 23/009 |
| 2003/0057889 | A1 | 3/2003 | Avis | |
| 2005/0057184 | A1 * | 3/2005 | Kaneko | H05B 45/18 315/247 |
| 2006/0083878 | A1 | 4/2006 | Bauman | |
| 2006/0171700 | A1 | 8/2006 | Yang et al. | |
| 2006/0222845 | A1 | 10/2006 | Deng et al. | |
| 2006/0261359 | A1 * | 11/2006 | Huang | F21V 29/58 257/98 |
| 2007/0159816 | A1 * | 7/2007 | Bayat | F21L 4/027 362/184 |
| 2007/0259307 | A1 | 11/2007 | Quan | |
| 2008/0272928 | A1 | 11/2008 | Shuster | |
| 2008/0303456 | A1 * | 12/2008 | Sun | H05B 45/37 315/308 |
| 2009/0097235 | A1 | 4/2009 | Chambers | |
| 2009/0129069 | A1 * | 5/2009 | Grossman | H01M 8/2475 429/8 |
| 2009/0182337 | A1 | 7/2009 | Stopek | |
| 2009/0185368 | A1 | 7/2009 | Holmes et al. | |
| 2009/0202656 | A1 | 8/2009 | Gimvang | |
| 2009/0310342 | A1 | 12/2009 | Chang | |
| 2010/0119802 | A1 | 5/2010 | Ford et al. | |
| 2011/0058142 | A1 | 3/2011 | Berit-Debat et al. | |
| 2011/0097574 | A1 | 4/2011 | Faldysta et al. | |
| 2011/0151218 | A1 | 6/2011 | Berstenhorst et al. | |
| 2011/0206817 | A1 | 8/2011 | Arnold et al. | |
| 2011/0311591 | A1 | 12/2011 | Wang et al. | |
| 2012/0003483 | A1 | 1/2012 | Salz et al. | |
| 2012/0069165 | A1 * | 3/2012 | Choi | H04N 1/00413 348/61 |
| 2012/0100380 | A1 | 4/2012 | Groenewolt | |
| 2012/0121845 | A1 | 5/2012 | Groenewolt et al. | |
| 2013/0106297 | A1 * | 5/2013 | Yeh | H05B 45/56 315/297 |
| 2013/0300296 | A1 * | 11/2013 | Mueller | H05B 45/58 315/129 |
| 2014/0252960 | A1 * | 9/2014 | Waser | H05B 45/18 315/297 |
| 2014/0293038 | A1 * | 10/2014 | Delmonico | H05B 45/28 348/82 |
| 2016/0249428 | A1 * | 8/2016 | Bandel | H05B 45/18 |
| 2016/0323972 | A1 * | 11/2016 | Bora | F21S 8/04 |
| 2016/0338171 | A1 * | 11/2016 | Bhagat | H05B 45/58 |
| 2016/0348880 | A1 * | 12/2016 | Galli | F21V 23/0421 |
| 2017/0094756 | A1 * | 3/2017 | Saffari | A01K 63/06 |
| 2017/0156188 | A1 * | 6/2017 | Krick | H05B 45/56 |
| 2019/0011089 | A1 | 1/2019 | Whiting et al. | |
| 2019/0059137 | A1 * | 2/2019 | Neumann | H05B 45/18 |
| 2019/0072835 | A1 | 3/2019 | Lee | |
| 2019/0150249 | A1 | 5/2019 | Bertken et al. | |
| 2019/0253670 | A1 | 8/2019 | Chien | |
| 2019/0394850 | A1 * | 12/2019 | Delgrange | H05B 45/10 |
| 2020/0288553 | A1 * | 9/2020 | Mccullough | H05B 45/54 |
| 2021/0144827 | A1 * | 5/2021 | Chen | H05B 47/17 |
| 2021/0160988 | A1 * | 5/2021 | Jooss | H05B 45/48 |

* cited by examiner

PORTABLE DEVICES, SYSTEMS AND METHODS WITH AUTOMATED HEAT CONTROL ASSEMBLY

RELATED APPLICATIONS

This application is a continuation-in-part application of, and claims the benefit under 35 U.S.C. § 120 to, U.S. patent application Ser. No. 16/926,610, filed Jul. 10, 2020, entitled “Multi-Mode Portable Lighting Devices. Systems And Methods With Novel Battery Charging Unit,” which is incorporated herein by reference in its entirety. This application is a continuation-in-part application of, and claims the benefit under 35 U.S.C. § 120 to, U.S. application Ser. No. 16/926,601, filed Jul. 10, 2020, entitled “Portable Devices, Systems and Methods for Alert Notification,” which is incorporated herein by reference in its entirety.

FIELD OF THE INVENTION

This patent document relates to portable electronic devices, including, for example, flashlights, headlamps and their circuitry. More particularly the subject matter of this patent document relates to portable electronic devices, systems and methods with automated heat control and/or monitoring assembly.

DESCRIPTION OF THE RELATED ART

Light sources, such as flashlights or headlamps, are widely used in households. They are also used by various professions, such as police, firemen, military and security personnel, as well as used for various activities, such as extreme sports, camping, walking, jogging or other activities in low-lit areas. Moreover, light sources are commonly used in emergency situations that may be unsafe, due to a power failure or in a remote area with risk to safety. Such lights sources typically include a lamp bulb or a light emitting diode (“LED”). Those with LEDs generally give off heat during operation and may employ various heat sink designs to facilitate dissipation of heat from the LED light source.

Despite the use of light sources for a long time, improvements made to these devices as compared to other consumer electronics have been minimal. Prior art light sources generally don’t monitor the temperature at or adjacent the heat sink nor automatically reduce heat generation if a temperature threshold is met and/or surpassed. Thus, the need for improvements to portable lighting devices still remains.

The present disclosure provides an improved portable LED light source, such as a flashlight or a headlamp, with an automated heat control and/or monitoring assembly.

SUMMARY

Portable devices, systems and methods with automated heat control assembly are provided. In one embodiment, the portable devices, such as a flashlight, may include a housing, a light source, a current source, a heat control circuit, a temperature sensor and a processor. The housing may have a proximal end and a distal end and defining a hollow cavity. The light source may be disposed at the proximal end of the housing and emitting a light intensity when energized. The current source may be electrically coupled to the light source and supplying current to the light source. The heat control circuit may be disposed in the cavity of the housing and electrically coupled to the light source and the current source. In one embodiment, the heat control circuit may be adapted to allow changing the current supplied to the light source. The temperature sensor may be disposed in the cavity of the housing and adapted to measure a temperature adjacent the light source and to output an associated temperature sensor data. Moreover, the processor may be disposed in the cavity of the housing and operatively coupled to the temperature sensor and the heat control circuit, and may be configured to receive the temperature sensor data and automatically adjust the current supply in the heat control circuit based on the temperature sensor data relative to a predetermined temperature threshold.

As can be appreciated, the adjusted current supply changes the light intensity of the light source. In one embodiment, the processor may be configured to decrease the current supply in the heat control circuit if the temperature sensor data is equal to or greater than the predetermined temperature threshold. In another embodiment, the processor may be configured to increase the current supply in the heat control circuit if the temperature sensor data is less than the predetermined temperature threshold. The heat control circuit may be adapted to allow changing the current supplied to the light source by changing a resistance applied in the heat control circuit.

In yet another embodiment, the portable lighting device may further include a heat sink assembly disposed at the proximal end of the housing, the heat sink assembly defining a hollow cavity. The light source may be disposed in the cavity of the heat sink assembly. The heat sink assembly may extend to the exterior of the housing to dissipate heat from the light source externally.

In another embodiment, a flashlight is provided. The flashlight may include a housing, a light source, a heat control circuit, a temperature sensor and a processor. The housing may have a proximal end and a distal end and defining a hollow cavity. The light source may be disposed at the proximal end of the housing and capable of emitting a first light intensity when energized with a first current from a current supply. The heat control circuit may be disposed in the cavity of the housing and electrically coupled to the light source and the current supply. The heat control circuit may be adapted to change the first current to a second current, whereby the light source emits a second light intensity when energized with the second current. The temperature sensor may be disposed in the cavity of the housing and configured to measure a temperature adjacent the light source and to output an associated temperature sensor data. Moreover, the processor may be disposed in the cavity of the housing and operatively coupled to the temperature sensor and the heat control circuit, the processor configured to receive the temperature sensor data and automatically adjust the first current to the second current in the heat control circuit based on the temperature sensor data relative to a predetermined temperature threshold.

As can be appreciated, the processor may be adapted to decrease the current supply in the heat control circuit if the temperature sensor data is equal to or greater than the predetermined temperature threshold. The processor may also be adapted to increase the current supply in the heat control circuit if the temperature sensor data is less than the predetermined temperature threshold. In one embodiment, the second current is less than the first current, and the second light intensity is visibly less than the first light intensity. The processor may be configured to adjust the current supply from the first current to the second current if the temperature sensor data is equal to or greater than a first predetermined temperature threshold.

In yet another embodiment, the light source may be capable of emitting a third light intensity when energized with a third current from a current supply. The third current is less than the second current and the third light intensity is visibly less than the second light intensity. As can be appreciated, the processor may be adapted to adjust the current supply from the first current to the second current if the temperature sensor data is equal to or greater than a first predetermined temperature threshold but less than a second predetermined temperature threshold. The processor may be further adapted to adjust the current supply from the second current to the third current if the temperature sensor data is equal to or greater than a second predetermined temperature threshold.

In yet another embodiment, a method for controlling heat emitted from a portable lighting device is provided. The method may include supplying current to a light source disposed at a proximal end of a housing; measuring a temperature adjacent the light source using a temperature sensor disposed in a cavity of the housing; outputting a temperature sensor data, associated with the measured temperature, from the temperature sensor to a processor disposed in the cavity of the housing; and automatically adjusting, using the processor, the current suppled to the light source based on the temperature sensor data relative to a predetermined temperature threshold.

Artisans skilled in the art would appreciate that the automatically adjusting step may include decreasing the current supplied to the light source if the temperature sensor data is equal to or greater than the predetermined temperature threshold. The automatically adjusting step may also include increasing the current supplied to the light source if the temperature sensor data is less than the predetermined temperature threshold. Further, the automatically adjusting step may include adjusting a resistance applied to a heat control circuit electrically coupled to the light source and the current supply.

Each of the foregoing various aspects, together with those set forth in the claims and described in connection with the embodiments summarized above and disclosed herein may be combined to form claims for a device, apparatus, system, methods of manufacture and/or use in any way disclosed herein without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION

Figure 1:
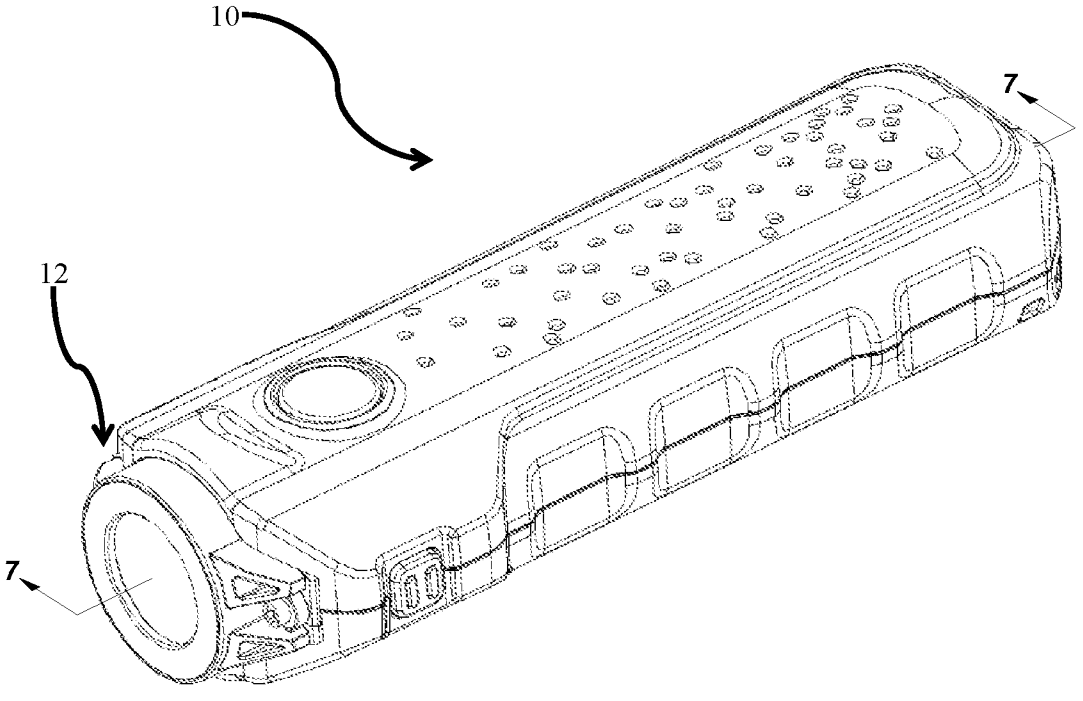
FIG. 1 is a front side perspective view of a portable device, such as a portable flashlight, according to an embodiment.
Figure 2:
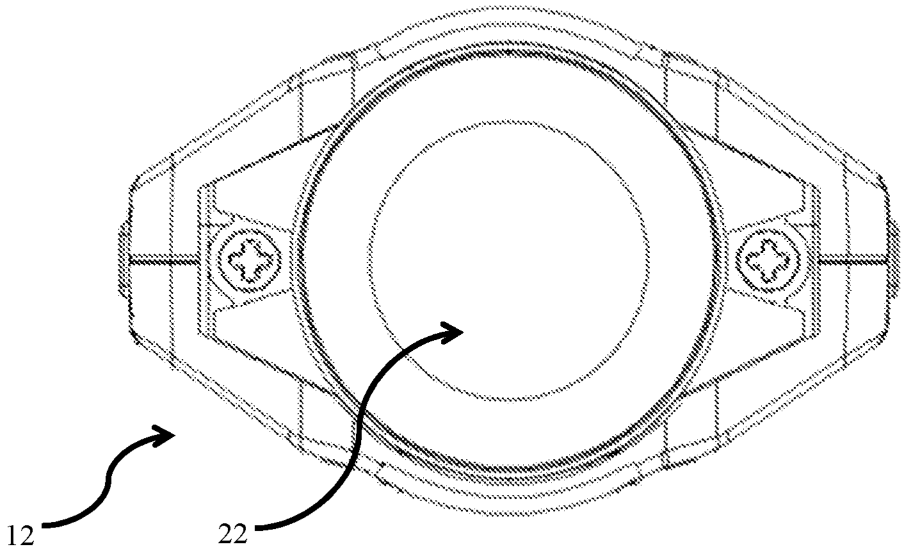
FIG. 2 is a front plan view of the portable device of FIG. 1, according to an embodiment.
Figure 3A:
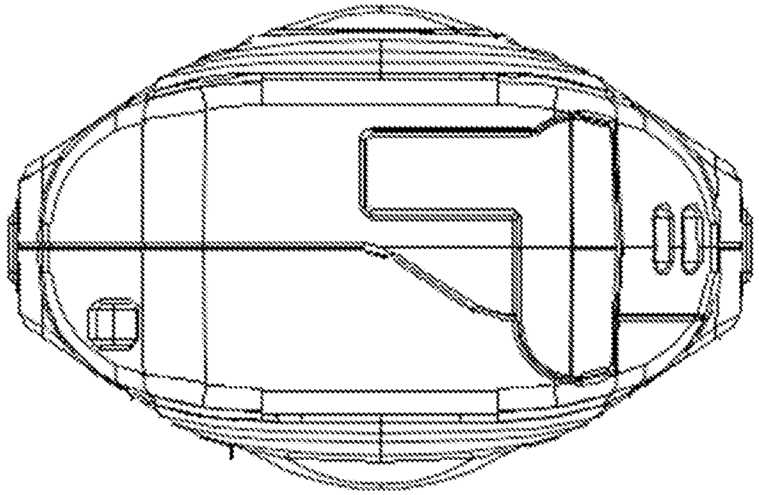
FIG. 3A is a rear plan view of the portable device of FIG. 1 with a cover for the power connector port, according to an embodiment.
Figure 3B:
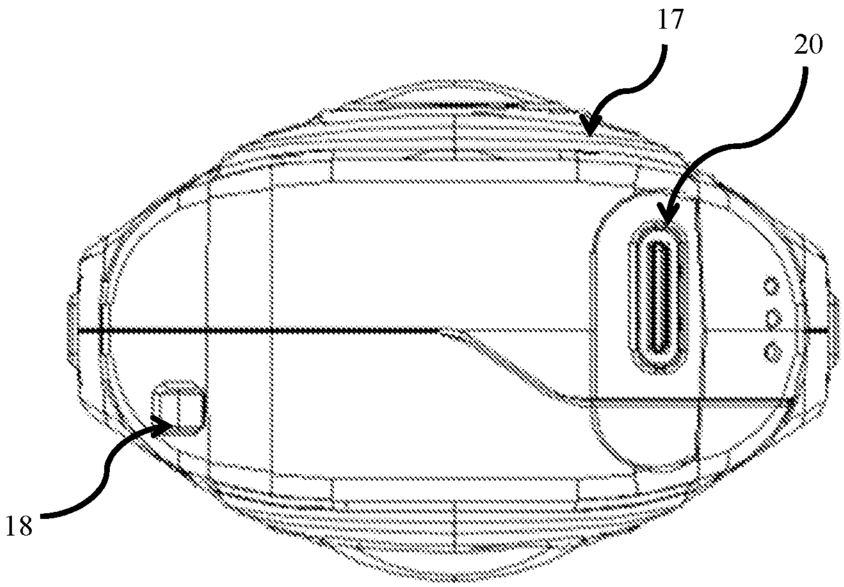
FIG. 3B is a rear plan view of the portable device of FIG. 1 without a cover for the power connector port, according to another embodiment.
Figure 4:
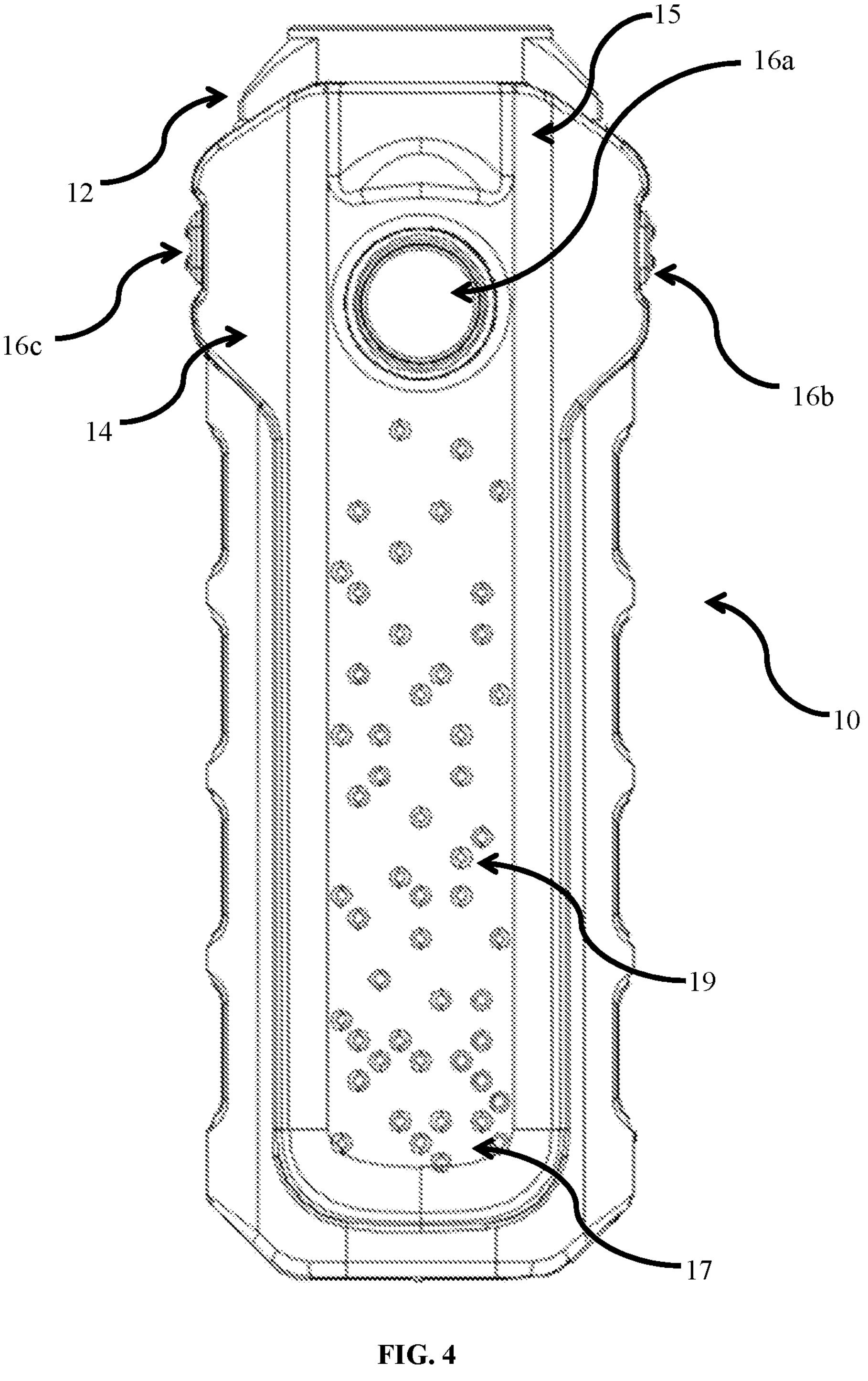
FIG. 4 is a top view of the portable device of FIG. 1, according to an embodiment.
Figure 5:
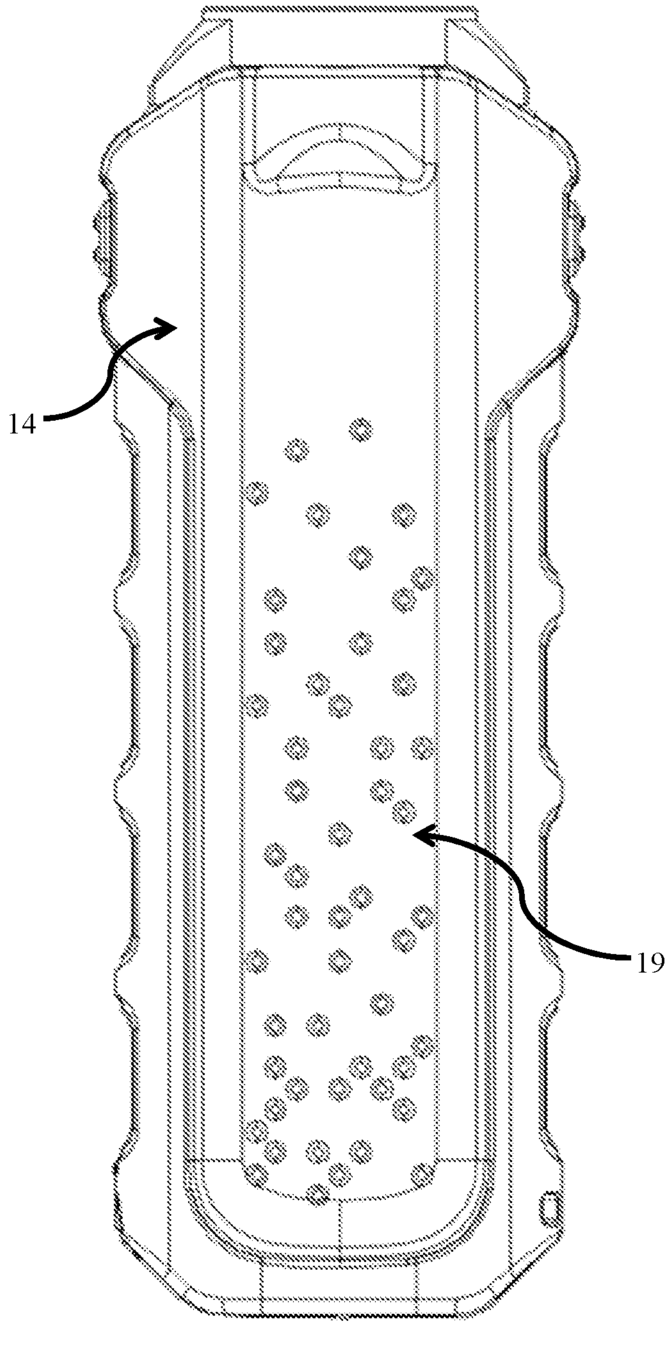
FIG. 5 is a bottom of the portable device of FIG. 1, according to an embodiment.
Figure 6A:
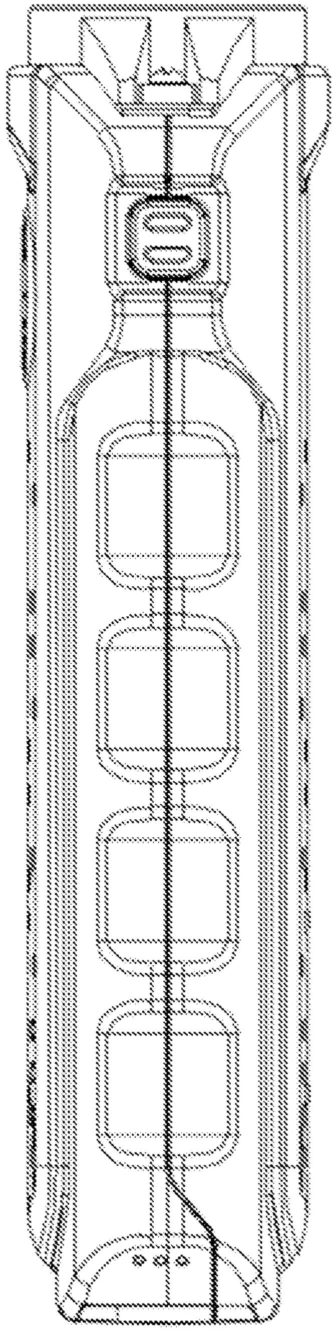
FIG. 6A is a right side view of the portable device of FIG. 1, according to an embodiment.
Figure 6B:
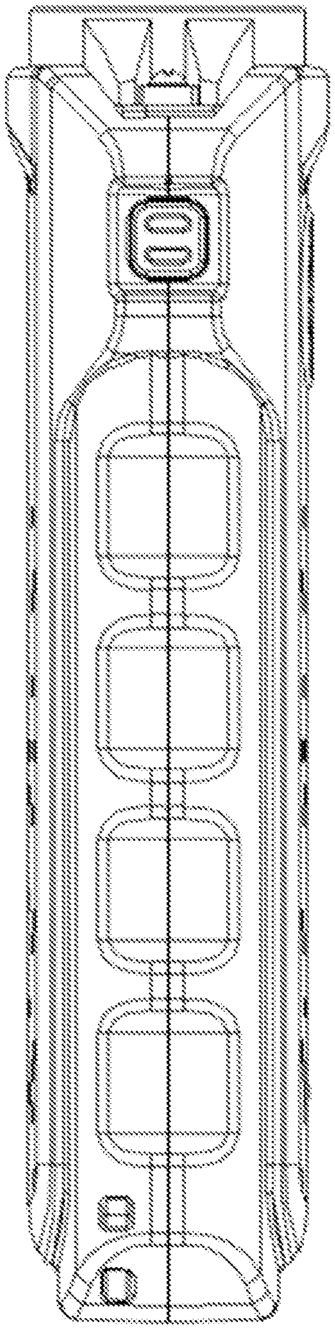
FIG. 6B is a left side view of the portable device of FIG. 1, according to an embodiment.

Unique and inventive portable devices, systems and methods of operation are disclosed herein. In one embodiment, the portable device may be a flashlight or a headlamp. Examples of flashlights are described in U.S. Pat. Nos. 8,366,290, 8,169,165 and 9,671,102, the disclosures of which are specifically incorporated by reference in their entirety. Although flashlight embodiments are disclosed herein, it is to be expressly understood that the present invention is not restricted solely to such embodiments. Rather, the present disclosure is directed to each of the inventive features described below, both individually as well as collectively, in various embodiments. Further, as will become apparent to those skilled in the art, one or more aspects of the present disclosure may be incorporated in other portable lighting devices, for example, headlamps.

FIGS. 1-6 disclose a portable device, such as flashlight 10, according to an embodiment. Flashlight 10 may include a head assembly 12, a housing 14, one or more control switches 16 (e.g., 16*a*, 16*b*, 16*c*), a speaker 18, and power connector port 20. The head assembly 12 is disposed about the forward end of the housing 14 and comprises a heat sink assembly. The housing 14 has a proximal end 15 and a distal end 17. The housing 14 may define a hollow cavity for receiving flashlight internal components. Housing 14 may also include one or more apertures and mounting features for mounting exterior components of the flashlight 10, such as the head assembly 12, switches 16, and connector port 20 and for permitting such components to be operatively connected to the internal components and circuitry of the flashlight 10. Housing 14 may also include an exterior surface with elongated gripping portion 19. In one embodiment, the power connector port 20 may be disposed about the distal end 17 of the housing 14, and the control switches 16 may be disposed on the top and/or a side of the housing 14. In other embodiments, the power connector port 20 and the control switch 16 may be advantageously positioned elsewhere on or about the housing 14.

As can be appreciated, the one or more control switches 16 may be used to control an actuation of the flashlight 10, a selection of ON/OFF power, a selection of Mode change, a status check on the flashlight 10, and/or an actuation of an alert SOS feature, among others. These features may be controlled through several control switches 16 on the flashlight 10. Alternatively, the features may be controlled though an integrated control switch 16. As shown in the exemplary embodiment on FIGS. 1-2, the flashlight 10 includes a top control switch 16*a* that may be used to control the actuation of a light source 22 (i.e. LED), a first side control switch 16*b* that may be used to control actuation and/or selection of LED lighting mode and power ON/OFF, and a second side control switch 16*c* that may be used to control actuation of device status check for wireless signal and/or battery capacity, among others. In another embodiment, the first side control switch 16*b* may be used for auxiliary features, such as a momentary flash feature, which momentarily flashes the light, or turn on warning LEDs or audio feature, and the second side control switch 16*c* may be used as a power ON/OFF of the device with a long press (i.e. 5 second press) and/or used as a "check" button to check device status, such as network connectivity, GPS lock and battery level.

As can be appreciated, the battery status check may be triggered with a single actuation of the second side control switch 16*c*, and may be configured to provide a warning LED or preset audio alert from speaker 18. For example, for an audio alert, the message may be full, above 80%, above 60%, above 40% and/or low. As another example, for warning LEDs, a blue light for a certain time period, i.e., 3 seconds, may represent battery above 80%, a yellow light may represent battery at or about 40%, and a red light may represent that the battery is low. Moreover, the network connectivity status check may, for example, be triggered with a double actuation of the second side control switch 16*c*, and may also be configured to provide a warning LED or preset audio alert from speaker 18. For example, for an audio alert, the message may "Good Network and GPS Signal," "GPS Signal Lost," and/or "All Signal Lost." As another example, for warning LEDs, a blue light for a certain time period, i.e., 3 seconds, may represent good signal, a yellow light may represent no GPS, and a red light may represent all signal lost.

In one embodiment, the light source 22 may be triggered to turn on momentarily with the actuation of the first side control switch 16*b*, and turns off when the first side control switch 16*b* is released. In another embodiment, the audio alert for battery status may be turned on/off with the actuation of the first side control switch 16*b*. For example, when actuating the first side control switch 16*b* for a certain period, i.e. 2 seconds, then the audio speaker 18 is turned ON/OFF for replay of preset audio alert.

In yet another embodiment, the top control switch 16*a* may be used to actuate the LED light source 22, and may be programmed with different LED light modes that change depending on the number of times the top control switch 16*a* is actuated and the sequence, for example, every actuation of the top control switch 16*a* may toggle through the actuation of one or more of the following exemplary operating modes of the light source: high, mid, low, fast-flashing, slow-flashing, etc.

In an alternative embodiment, the one or more control switches 16 may be depressed together to actuate other operations. For example, the first side control switch 16*b* and the second side control switch 16*c* may be depressed simultaneously to actuate an emergency mode (i.e. SOS alert or panic). Alternatively, the emergency mode may be triggered automatically under certain conditions, GEO Fencing, fall/crash detection or high temperature detection.

When the emergency mode is triggered, the light source 22 may be actuated to emit an SOS distress lighting pattern. In another embodiment, when the emergency mode is triggered, the speaker 18 may play preset audio to the user, for example, indicating that the emergency mode has been activated and/or an alert has been sent for the local authorities and/or to one or more pre-selected personal contacts. As explained further below, in emergency mode, the flashlight 10 may be configured to transmit an alert message (i.e. an SOS code) to a remote server 60 (shown in FIG. 10) via wireless communication. The remote server 60 may be configured to send alert notification for local authorities and/or to one or more pre-selected personal contacts. The personal contacts may be alerted via an App or by SMS. As can be appreciated, the user of flashlight 10 may input the mobile phone numbers of the pre-selected personal contacts via, for example, a phone App. The input mobile phone numbers may be transmitted and saved on the remote server 60, and thereafter, used to alert the personal contacts when the emergency mode on the flashlight 10 is actuated by the user at a later time. As such, personal contacts not using a phone App or who have their phone App turned off or disabled, are still able to receive an alert notification of the emergency via an SMS text message.

Figure 7:
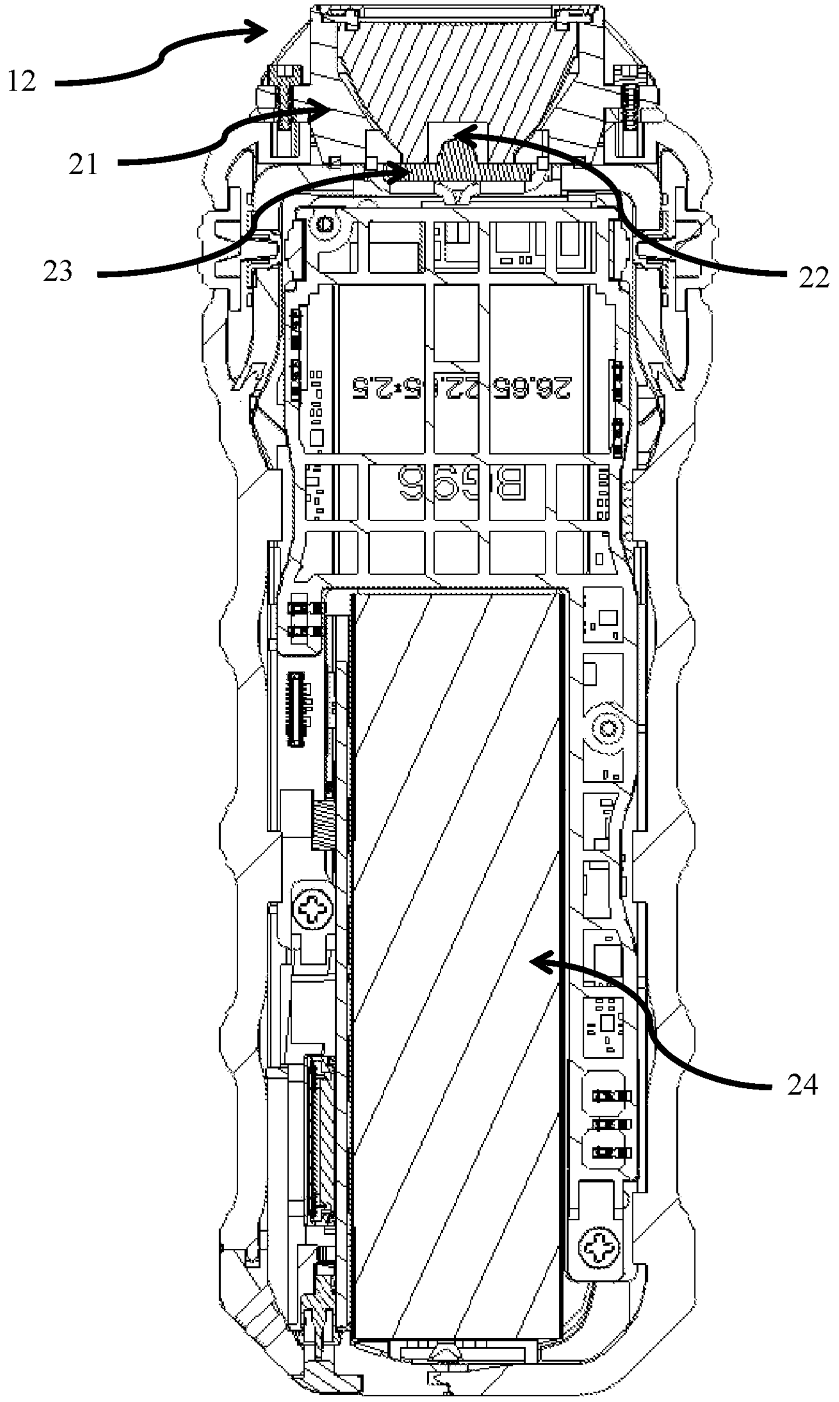
FIG. 7 is a cross-sectional view of the portable device of FIG. 1 taken along cut line 7-7 in FIG. 1.

FIG. 7 is a cross-sectional view of the portable device of FIG. 1 taken through the plane indicated by 7-7 in FIG. 1. A light source 22 is disposed at the proximal end 15 of the housing 14, preferably at a distal end of the head assembly 12. In one embodiment, the light source 22 may be a Light Emitting Diode (LED), but may also include an incandescent light source, such as halogen light source, xenon light source, krypton light source or tungsten-filament light source. In one embodiment, the light intensity output of the light source 22 may range from about 100 Lumens to about 10000 Lumens depending on the flashlight model. Desirably, the light intensity output of the light source 22 may range from about 100 Lumens to about 4000 Lumens.

Figure 13:
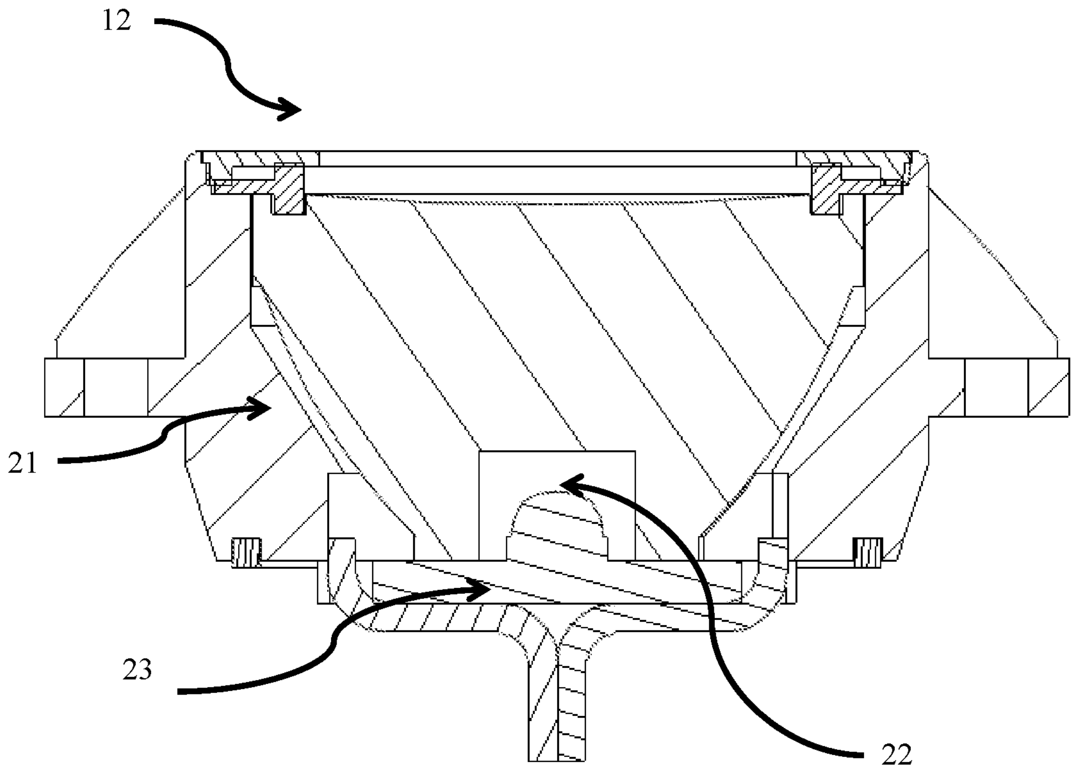
FIG. 13 is a cross-sectional view of the head assembly of the portable device of FIG. 1, according to an embodiment.
Figure 14A:
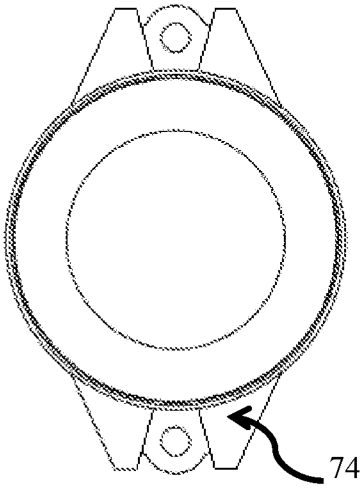
FIG. 14*a* is a front plan view of the head assembly of the portable device of FIG. 1, according to an embodiment.
Figure 14E:
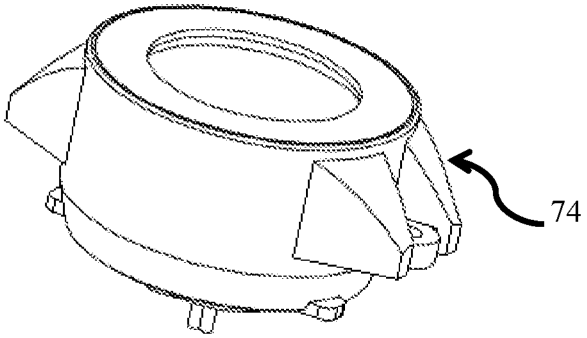
FIG. 14*e* is a front side perspective view of the head assembly of the portable device of FIG. 1, according to an embodiment.
Figure 14C:
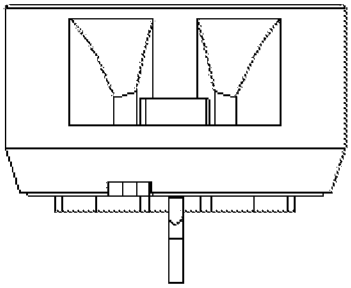
FIG. 14*c* is a left side view of the head assembly of the portable device of FIG. 1, according to an embodiment.
Figure 14D:
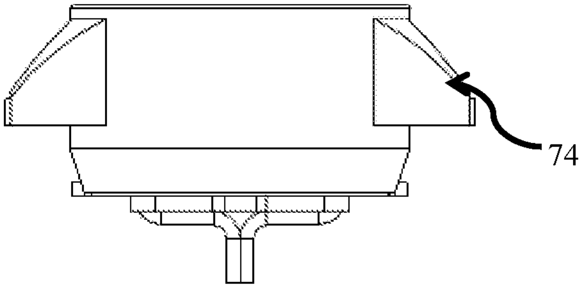
FIG. 14*d* is a top view of the head assembly of the portable device of FIG. 1, according to an embodiment.
Figure 14B:
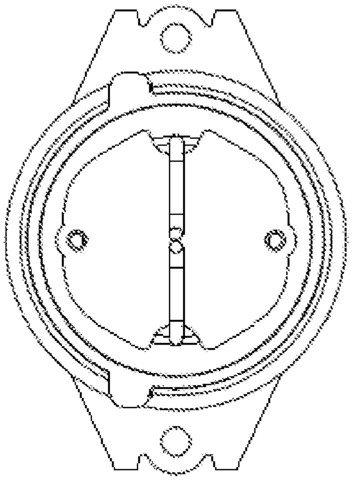
FIG. 14*b* is a rear plan view of the head assembly of the portable device of FIG. 1, according to another embodiment.

The head assembly 12 may be configured to facilitate heat dissipation from the LED light source 22 as well as the control and monitoring of the temperature from the LED lights source 22. Such configuration may be employed to channel the heat from the light source 22 to the front of the flashlight 10 so that it does not damage the sensors 26, battery 24 and other flashlight components. As shown in FIGS. 7 and 13, the head assembly 12 may comprise a heat sink 21 extending to the exterior of the housing 14. The base of the heat sink 21 may be coupled to a metal plate 23 (such as an aluminum plate) holding a flexible PCB (not shown), which has the LED light source 22 soldered thereon. As can be appreciated, heat dissipated from the LED light source would transfer to the plate 23 and then to the heat sink 21, which allows the heat to channel to the exterior of the flashlight 10 and to the outside air. As shown in FIGS. 13-14, the heat sink 21 may include one or more fins 74 to further increase the surface area of the heat sink 21 for heat dissipation. As discussed further below, in one embodiment, the intensity of the LED light source may be adjusted automatically to reduce the heat dissipated when the temperature measured by the one or more sensors 26 is at or above a predetermined temperature threshold.

Figure 8:
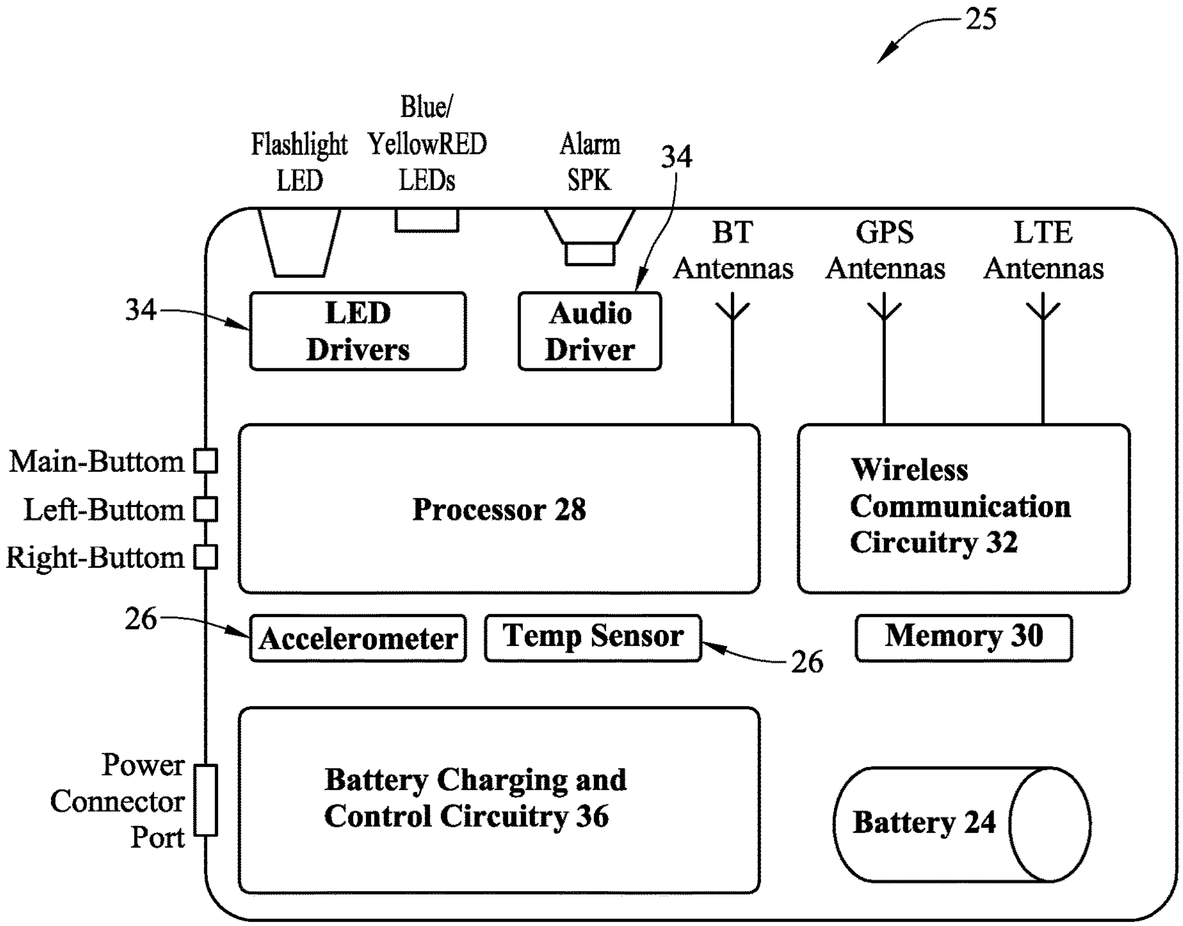
FIG. 8 is an exemplary block diagram illustrating circuitry of a portable device, according to an embodiment.
Figure 11:
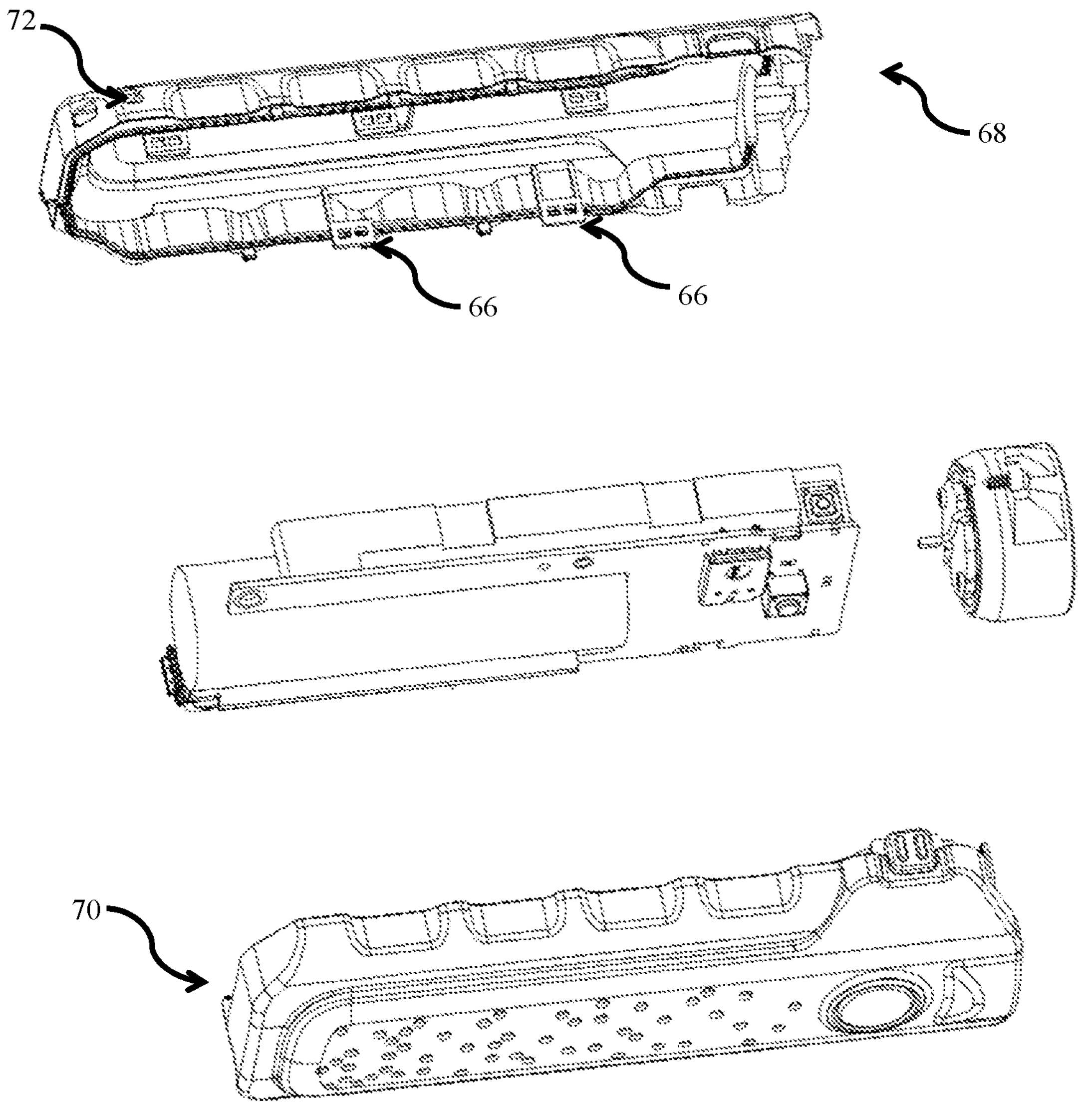
FIG. 11 is an exploded view of the portable device of FIG. 1, according to an embodiment.

FIG. 8 is an exemplary block diagram 25 illustrating circuitry of the portable device of FIG. 1, according to an embodiment. The portable device may include, for example, a battery bank 24, one or more sensors 26, a processor 28, a memory 30, a wireless communication circuitry 32, a DC-DC switch (not shown), one or more drivers 34, and a battery charging and control circuitry 36. In one embodiment, the battery bank 24 comprises one or more lithium-ion (preferably rechargeable) batteries. The battery bank 24 may be shaped generally cylindrical, as shown in FIG. 11, to fit within the housing 14, but may have other shapes as well. Desirably, the thickness t of the battery bank 24 may be in the range of between about 18-19 mm thick. The battery bank 24 may, for example, be able to hold 3.7 V or 3350 mAh of charge with a pulse current of 12 A.

In one embodiment, the battery bank 24 may be used to supply power to the flashlight 10, including the LED light source 22. In another embodiment, the battery bank 24 may also be used as a power bank to supply power to external electric devices via a charge cable electrically coupled to the power connector port 20. As can be appreciated, the power connector port 20 may be configured to receive a USB-C (USB Type-C) connector used in many electronic devices. Other types of connectors are also contemplated, including micro-USB and USB connectors used with other electronic devices. Alternatively, the power connector port 20 may be configured to receive a Lightning® connector used in Apple® iPhone® mobile devices. As can be appreciated, the power connector port 20 may also be used to couple the battery bank 24 to a power supply to recharge the batteries.

The one or more sensors 26 may be used to detect physical conditions, e.g., environment, in which the flashlight 10 is operated or exposed. For example, the one or more sensors 26 may include a heat sensor, a motion sensor, a temperature sensor, a GPS locator, and a pedometer. Other types of sensors may also be suitable. As can be appreciated, the motion sensor may be configured, for example, as a 3-axis accelerometer to optionally measure static acceleration (such as gravity), tilt of an object, dynamic acceleration, velocity, orientation and vibration of the object. Other known or developed sensors may also be employed to provide desired functionality to flashlight 10, such as temperature sensors, light sensors, magneto sensors, gyrometers, $CO_2$ sensors, etc. In one embodiment, the control switch 16*c* may be used to select a mode that actuates the operation of the one or more sensors 26. Other control switches may be employed to control the selection and actuation of the one or more sensors 26.

The data produced from the one or more sensors 26 may include, for example, temperature data, acceleration data, location and/or Global Positioning Satellite (GPS) coordinate data, pedometer data, or any combination of any of the foregoing. The data may be processed by the processor 28 and stored in memory 30. Other data relating to the flashlight 10 may also be stored in memory 30 and may be utilized by the processor 28 including, for example, model number data, part number data, serial number data, manufacturing data, electrical power source data, battery data, electrical power source charging data, battery charging data, operating time data, operating mode data, user operating mode settings, control switch 16 actuation data, voltage data, current data, processor data, firmware data, failure data, diagnostic data, among others, or any combination of any of the foregoing.

In one embodiment, the temperature sensor 26 may be operatively coupled to the processor 28 through a heat control and monitoring circuit (not shown), which supplies current to the light source 22. The temperature sensor 26 may be used to monitor the heat dissipation from the LED light source 22 and/or the heat sink 21. The temperature data may be transmitted to the processor 28 to control the light intensity emitted from the LED light source 22 based on predetermined conditions. If the temperature data is below a first temperature threshold, the processor 28 may be configured to automatically provide a light intensity output at Intensity Level A, for example, 4000 Lumens. If the temperature data is above the first temperature threshold but below a second temperature threshold, the processor 28 may be configured to automatically lower the light intensity output to Intensity Level B, for example, 3000 Lumens. For example, the light intensity output may be decreased by increasing the resistance R1 applied to the control and monitoring circuit (for example, by actuating a variable resistor (not shown)), thereby lowering the current supplied to the light source 22. Meanwhile, if the temperature data is above the second temperature threshold, the processor 28 may be configured to lower the light intensity output to Intensity Level C, for example, 1000 Lumens. Similarly, the light intensity output may be further decreased by increasing to resistance R2, thereby further lowering the current supplied to the light source 22. As can be appreciated, the automatic adjustment of the light intensity output based on temperature data readings provides automated control and monitoring of heat dissipation by the LED light source 22.

As can be appreciated the control and monitoring circuit (not shown) may include Memory 30 may include non-volatile read-only memory and/or non-volatile read/write memory as may be desired. For example, data stored by the manufacturer, e.g., model and part number, serial number and date of manufacture may be stored in a read-only memory such as an EPROM as might operating firmware, whereas other data, e.g., operating data, GPS coordinate data, temperature data and settings, may be stored in non-volatile memory such as RAM. All data could be stored in a memory that may be a part of processor 28 or may be wholly or partly separate therefrom.

The processor 28 may be utilized to process data from the one or more sensors 26 and/or the memory 30. As can be appreciated, the processor 28 may be a micro-controller, a microprocessor, a CPU, a processing device on a chip, or equivalent, which may be operatively coupled, for example, to the battery bank 24, the one or more sensors 26, the memory 30, the wireless communication circuitry 32, a DC-DC switch (not shown), the battery charging and control circuitry 36, the light source 22, the control switches 16 and the speaker 18. In one embodiment, the processor 28 may be a system-on-chip, such as Nordic Semiconductor's nRF52840 SoC with integrated Bluetooth 5 capability (including long range and high throughput modes), advanced IoT security, and a Cortex-M Series processor.

In one embodiment, the wireless communication circuitry 32 may be configured for transmission of radio frequency signals conforming to the Bluetooth and/or Wi-Fi standards. Bluetooth-enabled devices, such as mobile devices that employ Bluetooth circuitry, are capable of being paired with peripherals that conform to the Bluetooth standard. The resulting link between paired devices is often referred to as a peer-to-peer network. Thus, the wireless communication link formed between the wireless communication circuitry 32 of the flashlight 10 and the mobile device is a peer-to-peer network. Similarly, Wi-Fi enabled devices, employing Wi-Fi circuitry, are also capable of connecting with peripherals that conform to the WiFi standard, thereby establishing a wireless communication link between the devices. In another exemplary embodiment, the wireless communication circuitry 32 may be configured to transmit radio frequency for wireless mobile communication, such as 3G, 4G or 5G or other wireless mobile communication technology of higher specification, to a mobile device employing wireless mobile communication circuitry. For example, the wireless communication circuitry 32 may be a Qualcomm MDM9206 LTE chipset with 3G/4G multimode and multiband support and may integrate LTE Cat-M1 LTE technology, 2G GSM/GPRS cellular technology, Wi-Fi enabled for 802.1 lac standard technology and Bluetooth enabled for Bluetooth standard 4.1 technology. Alternatively, the wireless communication circuitry 32 may be a Quectel BG96 or BG95 chipset with LTE Cat-M1 LTE technology and, optionally, with LTE Narrowband IoT (NB-IoT) (also known as LTE Cat NB1) technology.

In one embodiment, the components disclosed herein may be provided on one or more printed circuit boards (or "PCBs"), which may contain such items as a controller, firmware, an authentication chip, a battery charging and control circuitry 36, among others. For example, the flashlight 10 may include a first PCB to control the light source 22, the wireless communication circuitry and the sensor 26 operations, and a second PCB to control the connector port 20 and battery charging and control circuitry 36. The first PCB may be electrically connected to the second PCB, for example, via a one or more wires or connectors. In an alternative embodiment, the components of the first PCB and the second PCB may be integrated onto a single PCB.

In one embodiment, the DC-DC switch may be integrated in the battery charging and control circuitry 36. As can be appreciated, the battery charging and control circuitry 36 may be configured to (a) receive a 5V charge via the power connector port 20; (b) control DC voltages in the flashlight 10 via the external 5V or from battery bank 24; (c) charge and/or manage the capacity of the battery bank 24; (d) control the operation of the battery bank 24; (e) control the charge-in and charge-out operation through the power connector port 20; and (f) adjust the usage or power intensity of the light source 22 when the battery bank 24 is being used to charge an external device (not shown). In one embodiment, the battery charging and control circuitry 36 may be configured to stop or halt power output to an external device if the capacity of the battery bank 24 is at or below a predetermined charge capacity (i.e., value set within the range between 5% charge capacity and 30% charge capacity) in order to preserve some battery charge for maintaining the operations of the flashlight 10.

Figure 9:
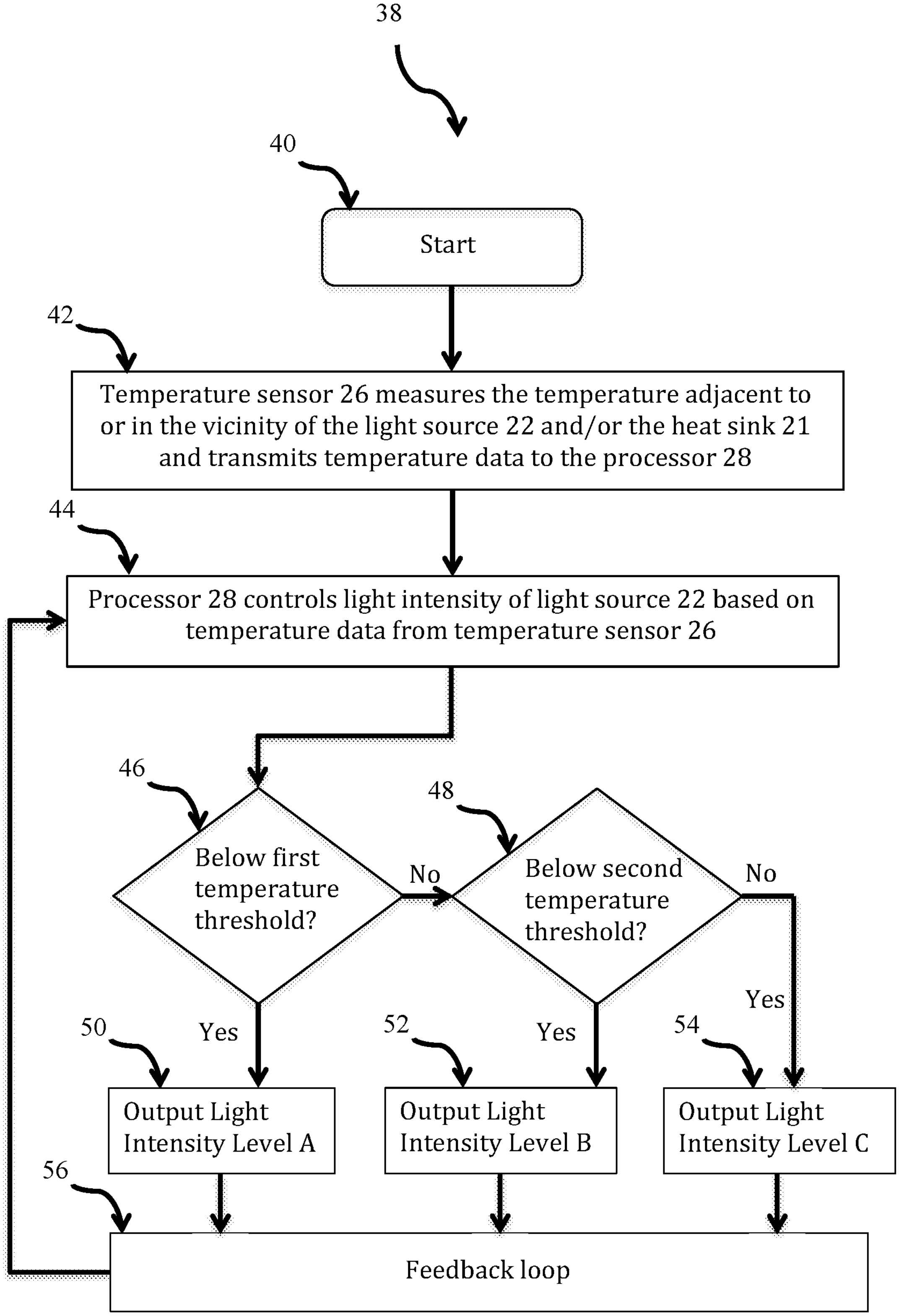
FIG. 9 is a flowchart illustrating exemplary operational features of an automated heat control and/or monitoring assembly, according to an embodiment.

FIG. 9 is a flowchart 38 illustrating exemplary operational features of the automated heat control and/or monitoring assembly, according to an embodiment. The operation may begin (40) when the control switch 16 is actuated, for example, to turn the light source 22 on. The temperature sensor 26 may be employed to measure the temperature adjacent to or in the vicinity of the light source 22 and/or the heat sink 21 and to transmit the temperature data reading(s) to the processor 28 (42). As noted above, the processor 28 may be configured to control the light intensity emitted by the light source 22, for example, by automatically increasing or decreasing the resistance R through a feedback loop, which in turn, decreases or increases the current supplied to the light source 22, respectively (44). The light source 22 may be any light emitting bulb or diode.

In one embodiment, based on the temperature data received, the processor 28 may be configured to determine if the temperature data is below a first temperature threshold (46). If the temperature data is below a first temperature threshold, the processor 28 may be configured to automatically control the resistance to Resistance R1 such that a light intensity output is set at Intensity Level A (50). If the temperature data is above a first temperature threshold, the processor 28 may be configured to further determine if the temperature data is below a second temperature threshold (48). If the temperature data is at or above the first temperature threshold but below the second temperature threshold, the processor 28 may be configured to automatically increase the resistance to Resistance R2 such that a light intensity output is set at Intensity Level B (52). Meanwhile, if the temperature data is at or above the second temperature threshold, the processor 28 may be configured to automatically increase the resistance to Resistance R3 such that a light intensity output is set at Intensity Level C (54). As can be appreciated by artisans skilled in the art, the automated heat control and/or monitoring assembly may employ one or more temperature thresholds for controlling light intensity of the light source 22 in order to reduce the temperature resulting from dissipated heat from the light source 22. The processor 28 may be configured with different conditions to automate an increase or decrease in resistance applied to the control and monitoring circuit. For example, in one embodiment, the output Intensity Level A may occur when the temperature data is at or below to the first temperature threshold. In another embodiment, the output Intensity Level A may occur when the temperature data is below to the first temperature threshold.

As can be appreciated, a feedback loop (56) may be provided for automated adjustment of the applied resistance based on the temperature data resulting from the heat dissipated due to the light intensity output. For example, if the temperature increases while the intensity is at a Light Intensity Level A, the processor 28 may be configured to automatically increase the resistance to Resistance R2 such that the light intensity output is reduced to Light Intensity Level B. Similarly, if the temperature increases while the intensity is at a Light Intensity Level B, the processor 28 may be configured to automatically increase the resistance to Resistance R3 such that the light intensity output is reduced to Light Intensity Level C. Conversely, if the temperature decreases while the intensity is at a Light Intensity Level C, the processor 28 may be configured to automatically decrease the resistance to Resistance R2 such that the light intensity output is increased to Light Intensity Level B. Moreover, if the temperature decreases while the intensity is at a Light Intensity Level B, the processor 28 may be configured to automatically decrease the resistance to Resistance R1 such that the light intensity output is increased to Light Intensity Level A. Such feedback loop (56) may continue throughout the duration that the light source 22 is turned on with the actuation of the control switch 16.

Figure 10:
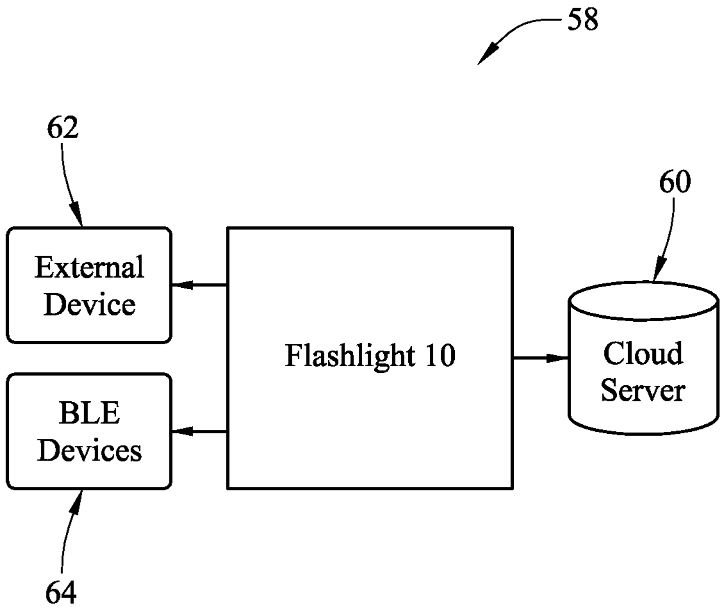
FIG. 10 is an exemplary block diagram of a communication system for alert notification, according to an embodiment.
Figure 12:
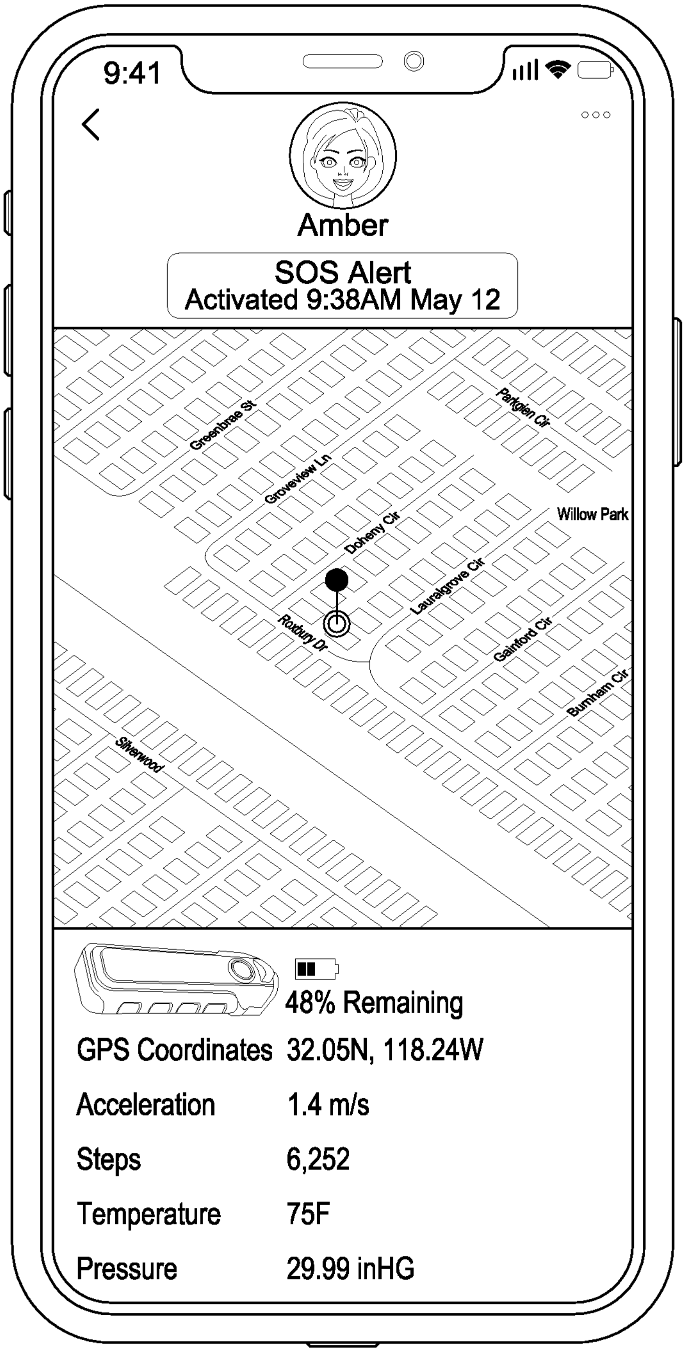
FIG. 12 is an exemplary display view on a mobile device when an app is used with the portable device, according to an embodiment.

FIG. 10 is an exemplary block diagram of a communication system for alert notification, according to an embodiment. The system may include a portable device, (such as flashlight 10), a remote server 60 and an external communication device 62, such as a mobile phone, and/or other external connected devices 64, which may be running an application software App (i.e. mobile phone App). The portable device may utilize the wireless communication circuitry 32 to transmit and receive data to or from the remote server 60 and/or the mobile phone App (application software) residing on an external communication device 62 and/or other external connected devices 64. In one embodiment, the transmission of data may be sent via SMS or internet connection. As can be appreciated, data stored in memory 30 or detected from the one or more sensors 26 may be optionally transmitted to the mobile phone App via the wireless communication circuitry 32. In one embodiment, the mobile phone App may synthesize the data and/or display on the mobile device. Optionally, the remote server 60 synthesizes the sensor data and transmit to the mobile phone for display on the mobile phone App. For example, as shown in FIG. 12, GPS data may be mapped on a digital map (i.e. Google map) and displayed on the mobile device, along with the emergency alert notification. Other conditions may also be detected by the portable device 10 and displayed on the mobile device App, including temperature, acceleration, steps and pressure, as shown in FIG. 12.

As noted above, the portable device 10 may include wireless communication circuitry 36, at least one sensor 26 and a processor 28. The processor 28 may be configured to receive an input signal associated with an activation of an emergency mode, and in response to the receipt of the input signal, transmit an output signal for transmission on the wireless communication circuitry, the output signal comprising the sensor data from the at least one sensor and an identification information of the portable device. The remote server 60 may be wirelessly coupled to the portable device 10 through a wireless link. The remote server 60 may be configured to receive the output signal from the wireless communication circuitry 36 of the portable device 10, retrieve from a storage medium a user's emergency alert settings based on the identification information of the portable device, and transmit an alert notification based on the emergency alert settings. In one embodiment, the mobile phone App may run on an external communication device, which is wirelessly coupled to the remote server 60. The mobile phone App may receive the alert notification from the remote server 60, which may include the sensor data from the at least one sensor 26.

In an embodiment, the flashlight 10 may employ multiple active reporting modes to report status, for example, to the mobile App. For instance, the flashlight may employ a constant reporting mode, a timed reporting mode and/or a trip reporting mode. The reporting may be any predetermined or preset parameters for reporting. The constant reporting mode may actuate the flashlight 10 to remain up all the time (i.e. not in sleep mode) and the report is sent in a pre-determined interval. The time reporting mode may actuate the flashlight 10 to enter constant reporting mode during configured time periods (i.e. start-time and end-time), which can be as multiple periods over multiple days. Finally, the trip reporting mode may actuate the flashlight 10 to report when the flashlight 10 is in motion, which takes place when the accelerometer detects movement of the device. If the flashlight 10 is stationary, the reporting would terminate.

As can be appreciated, the flashlight 10 may be IP67 waterproof compliant. In one embodiment, the flashlight 10 may include latching clips 66 to hold the two halves 68 and 70 of the housing 14 with fluid dispensing for the seam. In another embodiment, the speaker 18 may include a waterproof sound-permeable membrane. In yet another embodiment, the flashlight 10 may include an air vent 72 with waterproof-breathable membrane.

The flashlight 10 may also include a protective coating for water-resistance or water-proofing. In one embodiment, the flashlight 10 may be IP67 compliant. For example, the flashlight 10 may include a polymeric coating formed using a continuous plasma comprising a compound of $CH_2{=}C(R_1)—COO—R_2$, where $R_1$ includes —H or —$CH_3$; and where $R_2$ includes $—(CH_2)_2—(CF_2)_m—CF_3$ and m is 3 or 5, as disclosed in U.S. Pat. No. 8,852,693, whose contents are incorporated by reference in their entirety. Artisans would appreciate that other commercially available compounds may be used for forming a polymeric coating on the surface of the flashlight 10. In one embodiment, the protective coating has a thickness between about 250 nm and about 500 nm.

In one embodiment, the protective coatings may have an oleophobicity level of about at least 5, suitably between about level 5 to about level 10, including every level therebetween, such as about levels 5, 6, 7, 8, 9 or 10. Additionally, the coating can provide a water contact angle of at least 100°. In one aspect, the coating can provide a water contact angle between about 100° to about 120°. Such characteristics of the coating can help protect against pollutants and contamination, including water or moisture contamination. In one embodiment, the coating can protect against liquid damage. In another aspect, the contamination or liquid damage can be water.

The coating material may also be an antimicrobial coating. As will be appreciated by those skilled in the art, antimicrobial coatings may include additives such as silver, zinc, tin mercury, lead, iron, cobalt, nickel, manganese, arsenic, antimony, bismuth, barium, cadmium and chromium. Exemplary antimicrobial coatings may include, for example, those disclosed in U.S. Publ. Nos. US20060222845, US20070259307, US20110206817, US20090202656, US20090182337, and US20110311591, and in U.S. Pat. Nos. 8,080,028, 6,238,686, 5,770,255, 5,753,251, 5,681,575, 8,084,132, 7,884,089, 7,625,579, 7,955,636, 5,066,328, 8,124,169, 4,933,178, 8,066,854, 6,929,705, 5,997,815, 7,282,214, 7,976,863, 6,514,517, 5,238,749, 8,137,735, 6,592,814, 8,172,395, 7,402,318, 8,133,423, 5,853,745, 6,565,913, 8,178,120, 6,361,567, 5,756,145, 7,641,912, 6,900,265 and 5,244,667, each of which is incorporated by reference herein in its entirety. The coating material may also be a fire-resistant coating. Suitable fire-resistant coatings include, for example, those disclosed in U.S. Pat. Nos. 5,322,555, 5,236,773, U.S. Publ. No. US20060083878, and PCT Appl. No. PCT/EP2000/004914, each of which is incorporated by reference herein in its entirety. The coating material may also be a scratch resistant coating. Suitable scratch resistant coatings may include, for example, those disclosed in U.S. Pat. Nos. 7,867,602, 5,837,362, 6,025,059, 7,264,669, 7,115,050, 6,916,368, 6,020,419, 6,803,408, 6,835,420, 6,759,478, 8,163,357, 6,387,519, 7,053,149, 7,662,433, and 7,871,690, and U.S. Publ. Nos. US20120100380, US20110097574, US20100119802, US20110058142, US20120121845, US20120003483, and US20110151218, each of which is incorporated by reference herein in its entirety.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the inventive aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this disclosure is not be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

Further, all claim terms should be interpreted in their most expansive forms so as to afford the applicant the broadest coverage legally permissible. Although the embodiments have been described with reference to the drawings and specific examples, it will readily be appreciated by those skilled in the art that many modifications and adaptations of the processes, methods and apparatuses described herein are possible without departure from the spirit and scope of the embodiments as claimed herein. Thus, it is to be clearly understood that this description is made only by way of example and not as a limitation on the scope of the embodiments as claimed below.

What is claimed is:

1. A portable lighting device comprising:

a housing having a proximal end and a distal end, the housing defining a hollow cavity;

a light source disposed at the proximal end of the housing and emitting a light intensity when energized;

a current source electrically coupled to the light source and supplying current to the light source, the current source being the only current source of the portable lighting device;

a heat control circuit disposed in the cavity of the housing and electrically coupled to the light source and the current source, the heat control circuit adapted to allow changing the current supplied to the light source;

a temperature sensor disposed in the cavity of the housing and configured to measure a temperature adjacent the light source and to output an associated temperature sensor data; and a processor disposed in the cavity of the housing and operatively coupled to the temperature sensor and the heat control circuit, the processor configured to receive the temperature sensor data and automatically increase or decrease the light intensity of the light source by adjusting the current supply in the heat control circuit based on the temperature sensor data relative to a predetermined temperature threshold.

2. The portable lighting device of claim 1, wherein the adjusted current supply changes the light intensity of the light source.

3. The portable lighting device of claim 1, wherein the processor is configured to decrease the current supply in the heat control circuit if the temperature sensor data is equal to or greater than the predetermined temperature threshold.

4. The portable lighting device of claim 1, wherein the processor is configured to increase the current supply in the heat control circuit if the temperature sensor data is less than the predetermined temperature threshold.

5. The portable lighting device of claim 1, further comprising a heat sink assembly disposed at the proximal end of the housing, the heat sink assembly defining a hollow cavity, wherein the light source is disposed in the cavity of the heat sink assembly.

6. The portable lighting device of claim 5, wherein the heat sink assembly extends to the exterior of the housing.

7. The portable lighting device of claim 1, wherein the heat control circuit is adapted to allow changing the current supplied to the light source by changing a resistance applied in the heat control circuit.

8. The portable lighting device of claim 1, wherein the portable lighting device is a portable flashlight.

9. The portable lighting device of claim 1, wherein the processor is a microcontroller.

10. The portable lighting device of claim 9, wherein the processor is configured to automatically adjust the current supply to the light source from the current source when the current source is being used to charge an external device connected to the portable lighting device.

11. The portable lighting device of claim 9, wherein the processor is configured to automatically adjust the current supply to the light source from the current source when the current source is at or below a predetermined charge capacity.

12. The portable lighting device of claim 1, including a second temperature sensor disposed in the cavity of the housing and configured to measure a temperature of the physical condition of the environment which the portable lighting device is operated or exposed.

13. The portable lighting device of claim 1, including a first printed control board and a second printed control board, wherein the first printed control board includes the heat control circuit, and wherein the second printed control board is configured to control a charging of the current source including a connector port.

14. A flashlight comprising:

a housing having a proximal end and a distal end, the housing defining a hollow cavity;

a light source disposed at the proximal end of the housing, the light source configured to emit a first light intensity when energized with a first current from a single and only current supply;

a heat control circuit disposed in the cavity of the housing and electrically coupled to the light source and the current supply, the heat control circuit adapted to change the first current to a second current, the light source emitting a second light intensity when energized with the second current;

a temperature sensor disposed in the cavity of the housing and configured to measure a temperature adjacent the light source and to output an associated temperature sensor data; and a processor disposed in the cavity of the housing and operatively coupled to the temperature sensor and the heat control circuit, the processor configured to receive the temperature sensor data and automatically increase or decrease the light intensity of the light source by adjusting the first current to the second current in the heat control circuit based on the temperature sensor data relative to a predetermined temperature threshold.

15. The flashlight of claim 14, wherein the processor is configured to decrease the current supply in the heat control circuit if the temperature sensor data is equal to or greater than the predetermined temperature threshold.

16. The flashlight of claim 14, wherein the processor is configured to increase the current supply in the heat control circuit if the temperature sensor data is less than the predetermined temperature threshold.

17. The flashlight of claim 14, wherein the second current is less than the first current, the second light intensity is visibly less than the first light intensity.

18. The flashlight of claim 17, wherein the processor is configured to adjust the current supply from the first current to the second current if the temperature sensor data is equal to or greater than a first predetermined temperature threshold.

19. The flashlight of claim 17, wherein the light source is configured to emit a third light intensity when energized with a third current from a current supply, the third current is less than the second current, the third light intensity is visibly less than the second light intensity, and wherein the processor is configured to adjust the current supply from the first current to the second current if the temperature sensor data is equal to or greater than a first predetermined temperature threshold but less than a second predetermined temperature threshold, the processor is further configured to adjust the current supply from the second current to the third current if the temperature sensor data is equal to or greater than a second predetermined temperature threshold.

20. The flashlight of claim 14, further comprising a heat sink assembly disposed at the proximal end of the housing, the heat sink assembly defining a hollow cavity, wherein the light source is disposed in the cavity of the heat sink assembly.

21. The flashlight of claim 14, wherein the heat control circuit is adapted to allow changing the current supplied to the light source by changing a resistance applied in the heat control circuit.

22. The flashlight of claim 14, wherein the processor is a microcontroller.

23. A method for controlling heat emitted from a portable lighting device, the method comprising:

supplying current from a current source to a light source that is disposed at a proximal end of a housing and is emitting a light intensity when energized;

measuring a temperature adjacent the light source using a temperature sensor disposed in a cavity of the housing;

outputting a temperature sensor data, associated with the measured temperature, from the temperature sensor to a microcontroller disposed in the cavity of the housing; and automatically reducing, using the microcontroller, the current supplied from only the current source to the light source based on the temperature sensor data relative to a predetermined temperature threshold, to reduce the light intensity of the light source.

24. The method of claim 23, wherein the automatically adjusting step comprises decreasing the current supplied to the light source if the temperature sensor data is equal to or greater than the predetermined temperature threshold.

25. The method of claim 23, wherein the automatically adjusting step comprises increasing the current supplied to the light source if the temperature sensor data is less than the predetermined temperature threshold.

26. The method of claim 23, wherein the automatically adjusting step comprises adjusting a resistance applied to a heat control circuit electrically coupled to the light source and the current supply.

* * * * *